WOOD & KING.

Dredger.

No. { 143, 1,246. }

Reissued Dec 17. 1861.

N. PETERS, PHOTO-LITHOGRAPHER, WASHINGTON, D. C.

UNITED STATES PATENT OFFICE.

GEO. WOOD, JNO. KING, AND WM. LAWRENCE, OF PHILADELPHIA, PENNSYLVANIA, ASSIGNEES OF SAID WOOD AND KING.

IMPROVEMENT IN DREDGING-CRANES.

Specification forming part of Letters Patent No. 22,052, dated November 9, 1858; Reissue No. 1,246, dated December 17, 1861.

*To all whom it may concern:*

Be it known that we, G. WOOD, J. KING, and W. LAWRENCE, assignees of the said G. WOOD and J. KING, all of the city of Philadelphia and State of Pennsylvania, did obtain Letters Patent of the United States, dated November 9, 1858, for Improvements in Dredging-Cranes, which Letters Patent are deemed insufficient by reason of a defective specification; and we do hereby declare the following to be a full, clear, and exact description of the said invention, reference being had to the accompanying drawings, and to the letters of reference marked thereon.

The invention consists in mechanism for dredging for oysters or for coal, and for raising other sunken objects; and it consists of two barrels arranged on the deck of a vessel and provided with a clutch or its equivalent, described hereinafter, whereby the dredging process may, by being conducted on both sides of the vessel, be rendered continuous; also, in combining with the said barrels a jib or jibs, so as to form the crane described hereinafter, for facilitating the dredging operation; also, in a peculiar manner of hanging a pulley to the end of the jib, whereby the straining and fraying of the rope, as well as all undue friction, are obviated.

In order to enable others to make and use the invention, we will now proceed to describe its construction and operation.

Figure 1:
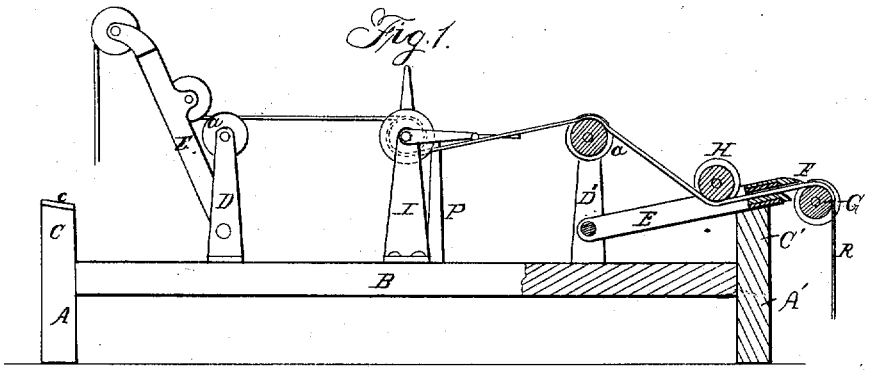
Figure 2:
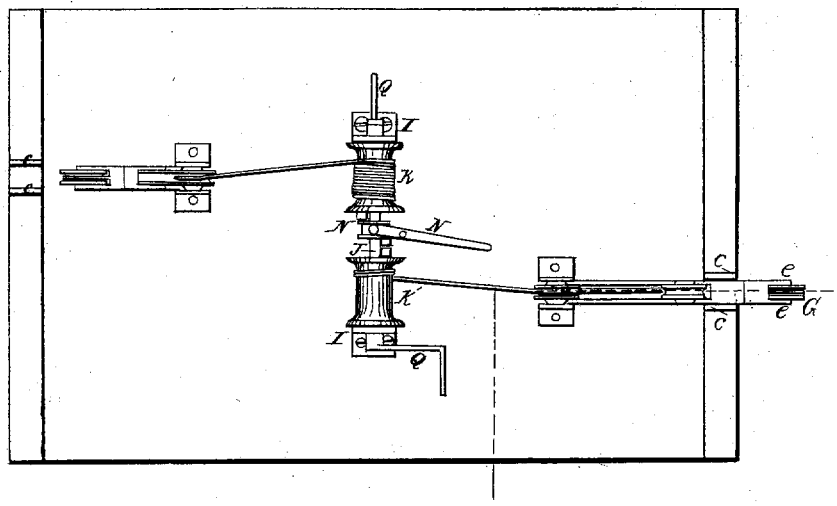

On reference to the accompanying drawings, which forms a part of this specification, Figure 1 represents a sectional view of a portion of a vessel with my improved dredging apparatus; Fig. 2, a ground plan, and Fig. 3 a view representing the end of the jib of the crane.

A and A′ are portions of the sides of a vessel; B, the deck; C and C′, the opposite rails. D and D′ are the posts of the two cranes, secured firmly to the deck, and to the top of each post is hung an ordinary sheave or pulley, *a*. The jib E of each crane is jointed to the post near the deck, the outer end of the jib projecting a convenient distance over the side of the vessel, and arranged to rest on the rail during the process of dredging, two chocks, *c c*, secured to the top of the rail, one on each side of the jib, serving to maintain the latter in its proper position and to resist any lateral strain which may be imparted to it.

In the end of each jib and in a line longitudinally with the same, is a circular opening, serving as a socket for the reception of the hollow stem of the carrier F. The two flanges *e e*, Fig. 2, project downward from and form a part of this carrier, and between these flanges a pulley, G, is hung loosely. On the jib E is hung another pulley, H, in such a position that a line drawn from its under edge to the upper edge of the pulley G coincides longitudinally with the center of the hollow stem of the carrier F.

On the deck, between the posts of the two cranes, are secured the two standards I I, in the top of which turns a shaft, J, and on the latter the barrels K and K′ are arranged to turn freely when not in gear with the clutch M. This clutch is situated between the two barrels, and may be slid along the shaft by the lever N on the pillar P, the clutch, which is incapable of turning independently of the shaft, being provided with projections arranged to catch in the projections on the inner ends of the barrels.

The shaft may be turned by the handles Q or other equivalent driving appliances.

Figure 3:
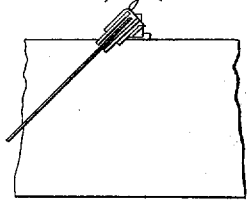

In dredging for oysters or for coal, or for other sunken objects, it has hitherto been customary to throw the dredging-instrument over the side of the vessel, and to make fast the chain or rope to which the instrument is attached. The vessel is then allowed to sail in the direction which the dredging apparatus is required to traverse, and when sufficient of the objects sought for are supposed to be collected the apparatus is hauled up the side of the vessel, lifted over the rail, and its contents deposited on the deck, the whole being accomplished by hand without the aid of mechanism. This operation, as it will be readily seen, is most tedious, and one requiring much muscular exertion on the part of the operatives engaged. It is for the purpose of lessening this labor and for facilitating generally the process of dredging that these improvements have been especially designed. From each barrel a rope or chain, R, passes over the pulley *a*, under the pulley H, thence through the hollow stem of the carrier F, over the pulley G, and down to the dredging-instrument. During the operation of dredging the jib rests on the rail, and is there retained in its proper lateral position by the chocks *c c*. As the vessel is sailing ahead the portion of the rope R which hangs over the side of the vessel will assume an angle, as seen in Fig. 3. As the stem of the carrier F, however, can turn in the socket at the end of the jib, the pulley G will adjust itself to any angle assumed by the rope, after the manner of the roller of an ordinary furniture-caster, the free movement of the rope being unaffected by any alteration in the position of the pulley, and being free from any liability to become frayed or strained—an evil to which it would be subjected by the use of the permanent pulley of ordinary hoisting-tackle. When the dredging-machine has collected the desired amount of oysters or other objects sought for, the clutch M is moved into gear with one of the barrels, the shaft J is turned by the handles *q* until the dredging-instrument, with its load, is hoisted above the water and catches the under side of the pulley G. The jib, with its load, then begins to rise until it assumes the position illustrated in the drawings, the dredging-instrument hanging immediately above the deck, onto which the load is emptied. The clutch M is then thrown out of gear with the barrel, and the rope, being unrestrained, allows the jib to fall to its former position on the rail and the dredging-instrument to sink to the bottom, when the above-described operation is repeated. By means of the two barrels K K, with their clutch, the operation of dredging is rendered continuous, for when one barrel is released, so as to allow the dredging apparatus on one side of the vessel to sink, that on the opposite side of the vessel is being raised. The movement of the shaft being continued, all that is necessary for the alternate raising and lowering the opposite dredging apparatus is the movement of the clutch M.

Although we prefer the use of the movable jibs for facilitating the depositing of the dredged objects onto the deck of the vessel, they may be dispensed with, the rope being allowed to fall over the side of a vessel or to pass over a permanent pulley attached thereto.

We claim as the invention of the aforesaid G. WOOD and J. KING, assignors to us, the said G. WOOD, J. KING, and W. LAWRENCE—

1. The two barrels K K, hung to the shaft J, in combination with the clutch M, or its equivalent, the whole being arranged on the deck of a vessel, and operating substantially as set forth, for the purpose specified.

2. In combination with the aforesaid barrels and clutch or its equivalent, the posts D and D′, each having a pulley, *a*, and a movable jib, E, with pulleys H and G, arranged in respect to the opposite sides of the vessel substantially as specified.

3. The carrier F, with its pulley G and its hollow stem, as arranged to turn in the socket in the end of the jib, substantially in the manner and for the purpose herein set forth.

In testimony whereof we have signed our names to this specification before two subscribing witnesses.

GEORGE WOOD.
JOHN KING.
WM. LAWRENCE.

Witnesses:
HENRY HOWSON,
JOHN WHITE.